INVENTORS
FREDERICK H. NICOLL &
BENJAMIN KAZAN

2,880,346
ELECTROLUMINESCENT DEVICE
Frederick H. Nicoll and Benjamin Kazan, Princeton, N.J., assignors to Radio Corporation of America, a corporation of Delaware Application September 30, 1954, Serial No. 459,454

3 Claims. (Cl. 313—108)

This invention relates to devices for the production of radiations, principally light, by subjecting phosphors to electric fields, and more specifically to such devices adapted to respond to direct current flow.

Phosphors are essentially semiconductors in the sense that they act as insulators when low voltages are applied thereto, but when the applied voltage is above a certain value, the phosphor will break down and conduct large amounts of current destroying at least some of the phosphor particles. No useful light is emitted under these conditions. However, it was discovered that by suspending certain phosphors in a transparent insulating material between two electrodes and applying a voltage above that at which the phosphors would normally break down, such phosphors can be induced to emit light. This phenomenon is commonly called "electroluminescence." The device appears to function essentially as a capacitor being capable of receiving and holding a charge when a voltage is applied thereacross. If the applied voltage is a D.C. voltage, it will charge up to the full value of the applied voltage. As such charging occurs, light will be induced in the phosphor, such light ceasing when the full charge has been received. If the voltage applied is A.C., the device will alternately charge and discharge inducing a series of bursts of light in the phosphor.

The explanations of these phenomena are not clear and several theories of operation are in force at present. One of these is the "field emission" theory, which postulates that an electric field exists across the region between particles of phosphor. If this field is strengthened sufficiently by an externally applied field, electrons may be drawn out of one particle and across the separating gap toward an adjacent particle which is thus bombarded in a manner similar to the usual low velocity electron bombardment of a phosphor screen. Under this electron bombardment the phosphor particles are induced to give off light. Regardless of theory, it was not possible in the prior art to produce usable electroluminescence except through the use of A.C. voltage.

Therefore, it is an object of this invention to provide a method of producing continuous and usable electroluminescence in response to direct current flow.

It is a further object of this invention to provide novel devices for the production of continuous and usable electroluminescence in response to direct current flow through such devices.

Briefly, this invention comprises subjecting powdered phosphor, each particle of which is effectively electrically connected in series with individual resistance, to direct current voltage. When direct current voltage is applied to such phosphor particles and series resistances, there is current flow through the particles which induces luminescence therefrom but is limited by the resistance in series with the particles to a value below that which would cause the particles to burn out. Thus, if an individual phosphor particle should break down under the influence of the applied voltage, the resistance in series therewith will limit the current flow through such particle to a value below that which would burn out the particle and will thus prevent the shorting of the applied voltage through that particle and around the remaining particles.

The invention is described in greater detail in connection with the accompanying single sheet of drawing wherein.

Figure 1:
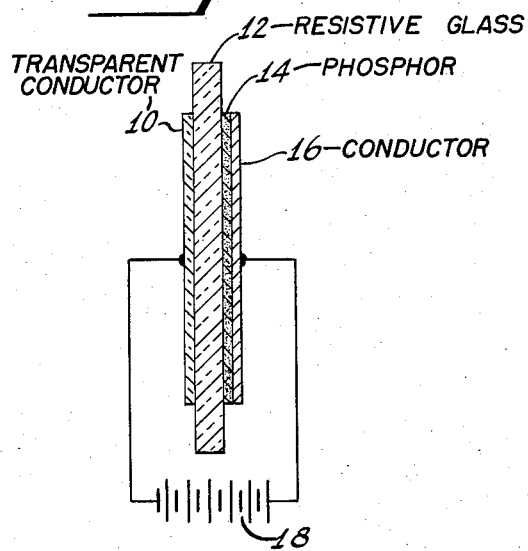
Figure 1 is a sectional view of a device according to this invention.

One form of this invention is shown in Figure 1. A transparent conductive coating 10 is applied (as by the deposition of the vapors of stannic acid, water, and methanol thereon) to one surface of a stratum or sheet of glass 12 (e. g. Pyrex or lime glass). A phosphor layer or stratum 14 is deposited on the opposite surface of the sheet of glass 12 by any convenient means (e. g. in the same manner as phosphor layers are applied to the screens of cathode ray tubes). A metallic layer 16 is applied to the phosphor layer 14 (e. g. aluminum, as in aluminizing cathode ray tube screens). A source of direct current 18 is then connected between the transparent conductive coating 10 and the metallic layer 16. At this point there will be no electroluminescence because the glass 12 is not properly conductive. However, if the glass 12 is heated by any convenient means until it has the desired resistance (e.g. having a resistance through a square centimeter in the neighborhood of $10^8$ ohms) direct current will flow through the phosphor particles 14 and the glass 12 causing the phosphor 14 to emit light. The heating of the glass 12 may be accomplished in a number of ways. One convenient way is to subject the device to a stream of hot air having a temperature well over 100° centigrade.

The series resistance represented by the glass 12 is essential in the operation of the device. If the direct current is applied to phosphor 14 alone some of the particles will be low in resistance or will break down, causing high current flow and the destruction of at least those particles of phosphor. The use of resistance in series with each particle, however, will prevent destructive current flow through any of the particles and will further prevent the removal of the applied electric field from the other particles.

The exact value of the series resistance is not critical and is difficult to specify. It will vary with the thickness of the phosphor layer and with the amount of applied voltage. The primary considerations are that the resistance be sufficient to prevent the burn out of individual particles and that it be capable of withstanding the full applied voltage without itself breaking down or burning out. The series resistance in the circuit should be kept as small as is commensurate with the above characteristics since it obviously represents a power loss in the circuit. As stated above, a resistance in the neighborhood of $10^8$ ohms through a square centimeter has been found to be satisfactory in the device shown in Figure 1.

The exact mechanism of the electroluminescence obtained is not clear, however, a luminescence of 5 foot lamberts has been observed for 1,000 volts applied across the device shown in Figure 1 causing a direct current flow of a few hundred microamperes for an area of 5 square centimeters.

Figure 2:
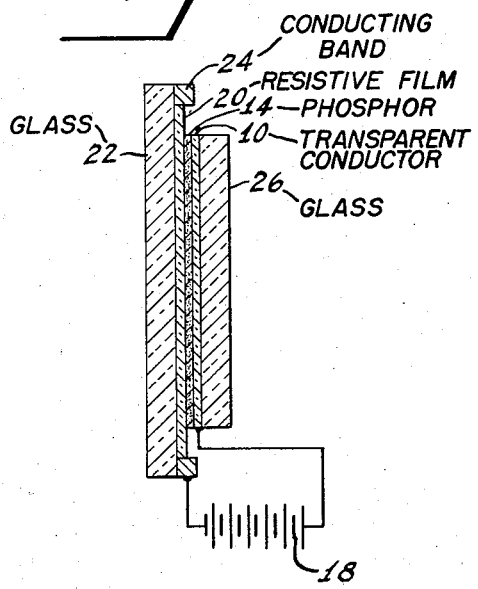
Figure 2 is a sectional view of another device according to this invention.

Another form of this invention is shown in Figure 2. In this device a resistive film 20 is formed on a sheet of lead glass 22 by heating the lead glass 22 in hydrogen. A conducting band 24 is applied around the perimeter of the resistive film 20 and a thin dry layer of phosphor 14 is deposited on a central portion of the resistive film 20 by any convenient means. One surface of a sheet of ordinary glass 26 is given a transparent conductive coating 10 (as by the deposition of the vapors of stannic acid, water and methanol thereon) and the transparent conductive coating 10 is placed in contact with the phosphor layer 14. A source of direct current 18 is then connected between the conductive band 24 and the transparent conductive coating 10.

In this device the resistive film 20 provides, in effect, a resistance in series with each particle of phosphor 14. Thus, enough direct current is allowed to flow through each phosphor particle 14 to cause electroluminescence but the current flow is limited by the resistance to a value below that which would cause destructive breakdown of any individual particles. Further, the resistive layer 20 must be capable of withstanding the full applied voltage should any individual particle be a dead short.

It should be noted that any material could be used in place of the sheet of glass 12 in Figure 1 or the resistive film 20 in Figure 2 if it meets the proper electrical requirements. Such requirements, as has been previously pointed out, are that the resistance effectively placed in series with each phosphor particle must be sufficient (e.g. the resistive layer should have a resistance on the order of $10^8$ ohms through each square centimeter thereof) to limit the current flow to a value below that which would cause destructive breakdown of the phosphor particle. Further, such resistance must be able to withstand the full applied voltage without burning or puncturing if one of the particles should prove to be a dead short.

Figure 3:
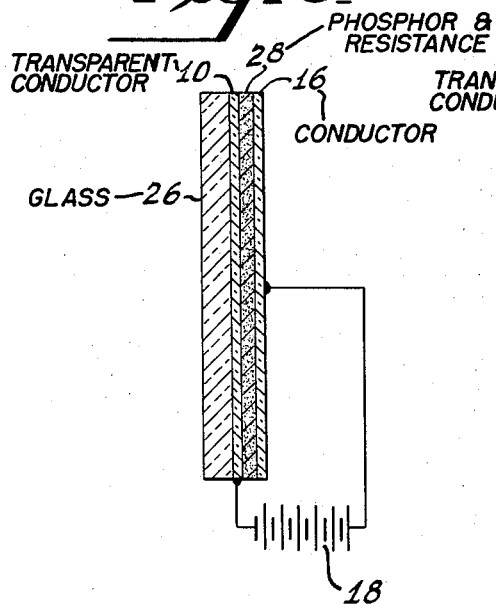
Figure 3 is a sectional view of yet another device according to this invention.

Figure 3 shows a further variation of this invention. In this device a sheet of glass 26 has applied to one surface thereof a transparent conductive coating 10. An electroluminescent layer 28 consisting of phosphor particles bound together by a transparent plastic or ceramic material having the proper resistivity, is applied to the transparent conductive coating 10. A metallic electrode 16 is applied to the electroluminescent layer 28. A source of direct current 18 is connected between the transparent conductive coating 10 and the metallic electrode 16. The direct current will pass through the electroluminescent layer 28 which is effectively a parallel array of phosphor particles each in series with a resistance, causing the phosphor particles to electroluminesce. The direct current flow through each particle of phosphor will be protectively limited by the resistance of the plastic or ceramic material which is effectively in series with each of such particles.

The devices of this invention may be adapted to reproduce light images or images comprised of other radiations. It has been found that the brilliance of the light emitted from the above devices is dependent upon the amount of current flowing therethrough. In other words, the level of light output from such devices varies directly with the level of current through the device. Thus, if an individual particle of phosphor and its protective series resistance are electrically connected in series with a variable resistor, the light output from such particle of phosphor may be controlled by altering the resistance of such variable resistor. The use of a variable resistor such as a photoconductive material makes possible the reproduction of images since the brilliance of the light emitted by each individual phosphor particle could be controlled by the intensity of radiations reaching a photoconductive particle associated therewith.

Figure 4:
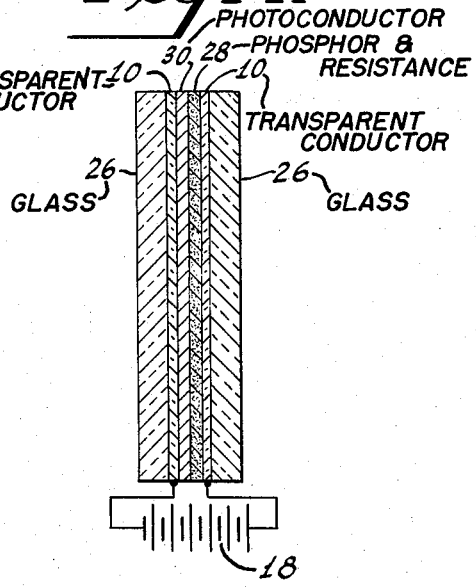
Figure 4 is a sectional view of a device according to this invention further adapted to be capable of reproducing radiation images.

In Figure 4 a device according to this invention is shown which is adapted to make possible the control of the intensity of the electroluminescence produced in accordance with incident radiation images. A photoconductive layer 30 (e.g. cadmium sulfide) and the layer 28 of phosphor particles bound together by a resistive material are contained between transparent conductive coatings 10 on sheets of glass 26. Electroluminescence will be produced as described in connection with Figure 3 with the exception that the intensity of the light emitted by each particle of phosphor will be controlled by radiations incident upon the particles of the photoconductor layer 30 associated therewith.

A photoconductive layer could also be added to the device shown in Figures 1 and 2 in order to make the electroluminescent produced thereby controllable in accordance with incident radiations. In addition, the phosphor particles could be intermingled with a photoconductive powder alone and placed between electrodes. In this case, however, the photoconductor would have to be carefully chosen so that its resistance even in the light will be sufficient to provide protection for the phosphor particles as has been described heretofore.

It is obvious that a novel method of and means for producing electroluminescence has been provided which will greatly enhance the value of the electroluminescent devices to those skilled in the art. Direct current electroluminescence is readily adapable to most of the systems which now utilize alternating current electroluminescence. Thus, this invention is not limited to the illustrative forms, herein described, but is flexible in both form and application.

What is claimed is:

1. An electroluminescent device comprising a first planar conductive electrode, a stratum consisting of phosphor particles in contact with said first electrode, a stratum consisting of resistive material in contact with said stratum of phosphor particles, and a second planar conductive electrode in contact with said resistive stratum, said resistive stratum having a resistance through a square centimeter thereof in the neighborhood of $10^8$ ohms, whereby direct current may flow through said device.

2. An electroluminescent device comprising a sheet of resistive glass having a resistance through a square centimeter thereof of about $10^8$ ohms, a first planar conductive electrode on one surface of said sheet of glass, a layer consisting of phosphor particles in contact with the other surface of said sheet of glass, and a second planar conductive electrode in contact with said layer of phosphor particles.

3. An electroluminescent device comprising a first planar conductive electrode, a stratum consisting of phosphor particles in contact with said first electrode, a stratum consisting of resistive material in contact with said stratum of phosphor particles, a second planar conductive electrode in contact with said resistive stratum, and a source of direct current connected to said electrodes, said resistive stratum having a resistance through a square centimeter thereof in the neighborhood of $10^8$ ohms, whereby direct current may flow through said device.

References Cited in the file of this patent

UNITED STATES PATENTS

| 2,650,310 | White | Aug. 25, 1953 |
| 2,692,948 | Lion | Oct. 26, 1954 |
| 2,694,785 | Williams | Nov. 16, 1954 |
| 2,714,683 | Jenkins | Aug. 2, 1955 |
| 2,755,400 | Stiles | July 17, 1956 |
| 2,780,731 | Miller | Feb. 5, 1957 |

FOREIGN PATENTS

| 157,101 | Australia | June 16, 1954 |

OTHER REFERENCES

G. E. Review, July 1954, pp. 46–49, article "Electroluminescence," by W. W. Piper.

"A Solid-Static Image Intensifier," by R. K. Orthuber and L. R. Ullery, vol. 44, No. 4, April 1954, pp. 297–299, Journal of Optical Society of America.

"Transient Voltage Indicator and Information Display Panel," by A. Bramley and J. E. Rosenthal, Review of Scientific Instruments, vol. 24, No. 6, June 1953, pp. 471, 472.

"Field Dependent Fluorescence of Vitreous $Zn_2SO_4$ Phosphor," by A. Bramley and J. E. Rosenthal, Physical Review, vol. 87, September 15, 1952, p. 1125.